P. & B. DE MATTIA.
PNEUMATIC TIRE BUILDING APPARATUS.
APPLICATION FILED JUNE 13, 1916.

1,225,593.

Patented May 8, 1917.

WITNESSES

INVENTORS
ATTORNEYS

UNITED STATES PATENT OFFICE.

PETER DE MATTIA AND BARTHOLD DE MATTIA, OF CLIFTON, NEW JERSEY.

PNEUMATIC-TIRE-BUILDING APPARATUS.

1,225,593.  Specification of Letters Patent.  Patented May 8, 1917.

Application filed June 13, 1916. Serial No. 103,427.

*To all whom it may concern:*

Be it known that we, PETER DE MATTIA and BARTHOLD DE MATTIA, both citizens of the United States, and residents of Clifton, in the county of Passaic and State of New Jersey, have invented a new and Improved Pneumatic-Tire-Building Apparatus, of which the following is a full, clear, and exact description.

The present invention relates to improvements in tire-building apparatus, and more particularly to apparatus such as set forth in United States Patent No. 1,194,967, granted to us August 25, 1916, to which patent cross-reference is here made.

Among the principal objects which the present invention has in view are: to obtain a greater extension of the centering bars; to prevent the inadvertent retraction of said bars; and to simplify the construction and to reduce the cost thereof.

Drawings.

Figure 1:
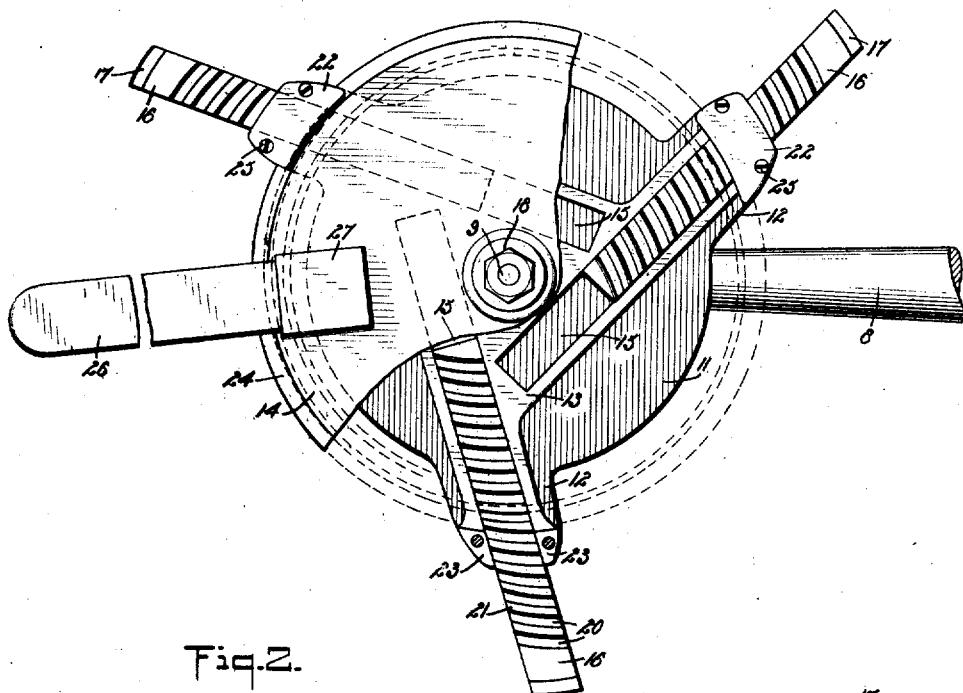
Figure 1 is a top face view of an apparatus constructed and arranged in accordance with the present invention, a portion of the cover plate being removed to show the construction below.

Description.

In the construction disclosed in the patent above referred to, the centering bars with which the apparatus is provided, radiate from the center of the apparatus. As a result of this arrangement, the movement of said bars is limited to half of the diameter of the chuck formed by the cover plate. This arrangement resulted in limiting the field of usefulness of the apparatus unnecessarily and has required the adoption of chucks for use in tires, the diameters whereof are more nearly approximate than the trade demands.

In the present invention, a bracket arm 8 is used to support the chuck, and has for that purpose a stud shaft 9, over which the bearing 10 of a plate 11 rests. The plate 11 has a series of extension arms 12, the ends of which protrude beyond the cover plate 14. The plate 11 and arms 12 have a thickened portion 13, wherein channels 15 are formed, preferably by being cast therein. The channels 15 are offset from the shaft 9. The inner end of each channel is carried as close to the adjacent channel to which it stands in angular relation, as is possible, this being the limitation of the length of the said channel and the length of the centering bars 16, to receive which said channels are provided.

The centering bars 16 have each a blunted end 17, said end being V-shaped in cross-section to fit the centering groove of the conventional tire-building core.

Figure 2:
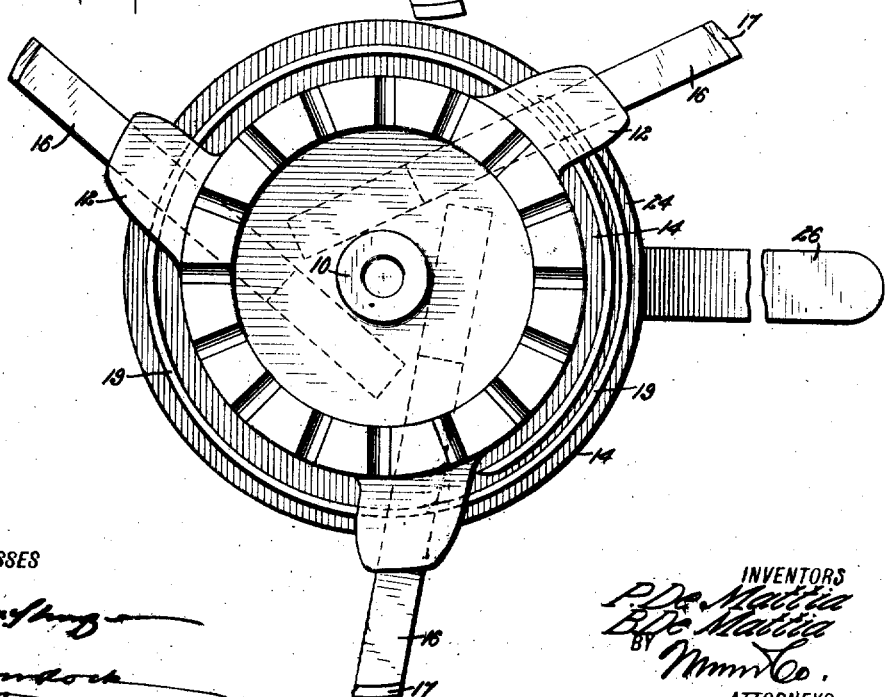
Fig. 2 is a view of the reverse face of the apparatus.

When the bars are placed in the channels 15, they are retained therein by the cover plate 14. The cover plate 14 is secured in operative position by a screw nut 18, the threads whereof engage a threaded end or extension on the shaft 9. As seen best in Fig. 2 of the drawings, the cover plate 14 has a spiral ridge 19 adjacent the outer edge thereof, the ends of said ridge being lapped. The lapped ends of the spiral ridge 19 are spaced in correspondence with the grooves 20 between the teeth 21 of racks formed on each of the bars 16.

The bars 16 are provided with teeth 21 to the full length of the said bars. The teeth 21, as shown best in Fig. 1 of the drawings, are shaped concentric to the shaft 9 and plate 11, when the bars 16 are in working position in the channels 15.

When the cover plate 14 is superposed on the plate 11 and bars 16, care is exercised to place the ridge 19 in grooves 20 corresponding in all of the bars 16. The plate 14 and bars 16 are then secured permanently in service relation, by adjusting the cap plates 22 on the abutments 23 with which the arms 12 are provided. The plates 22 project over a flange 24 with which the plate 14 is provided, and are secured in position by screws 25.

To operate the chuck, a hand bar 26 is provided. To receive the hand bar in operative position, the plate 14 has a housing 27, which furnishes a socket for the end of the bar 26. By means of the bar 26, the plate 14 is rotated on the plate 11; the spiral ridge 19 engaging successively the teeth 21 of the bars 16 to move each of the bars outwardly from the channels 15. The movements of the bars 16 are uniform and synchronous.

A ring core such as is used with an apparatus of the character described, is centered by the bars 16, the ends 17 thereof entering the groove with which the said core is provided.

In the operation of centering the core, considerable pressure is exerted thereon by the bar 26. If not prevented, the vibration incident to the operation of building the tire on the said core, would retract the bars 16, to the end that the core would become loosened in the apparatus. In the present construction this is avoided by the angular disposition of the bars 16 to the line of pressure on the core. These lines of pressure radiate from the center of the plates 14 and 11, and therefore, cross the line of extension or the linear center of the bars 16. The result of the arrangement is that the bars 16 are slightly rocked on the ridge 19 sufficient to jam thereon or become automatically locked against any retractive force exerted by the core supported by the said bars.

When it becomes necessary to release the core, this is accomplished by moving the plate 14 contra-clockwise when the operation of the ridge 19 on the teeth 21 retracts the bars 16.

It will be observed that, as a result of the lengthened channels 15, the bars 16 are proportionally lengthened and the expansion to the working position of said bars is materially increased over the corresponding limits of the arms disclosed in the patent above referred to.

By employing the central convolution of the ridge 19 and a series of teeth 21 in each of the bars 16, a considerable saving in the cost of the construction is attained as compared with that shown in the above-mentioned patent where the arms are provided with a single tooth and the cover plate has a spiral ridge providing a full series of convolutions.

Claims.

1. An apparatus as described comprising a series of centering bars grouped about a central bearing, said bars being movable in lines offset from said bearing; means for moving said bars simultaneously toward and away from the center of said bearing; means for guiding said bars in their movement, said means embodying a rotary supporting plate supporting said bearing and having end-opening channels therein for holding said bars; and a cover plate rotatively mounted on said supporting plate and operatively engaging all of said bars for moving the same in unison for expansion and contraction thereof.

2. An apparatus as described comprising a series of centering bars grouped about a central bearing, said bars being movable in lines offset from said bearing; means for moving said bars simultaneously toward and away from the center of said bearing; means for guiding said bars in their movement, said means embodying a rotary supporting plate supporting said bearing and having end-opening channels therein for holding said bars; a cover plate rotatively mounted on said supporting plate and operatively engaging all of said bars for moving the same in unison for expansion and contraction thereof; and means operatively connecting said bars and said plate, said means embodying rack teeth on each of said bars, and a spiral ridge on said cover plate engaging said teeth.

3. An apparatus as described comprising a series of centering bars grouped about a central bearing, said bars being movable in lines offset from said bearing; means for moving said bars simultaneously toward and away from the center of said bearing; means for guiding said bars in their movement, said means embodying a rotary plate supporting said bearing and having end-opening channels therein for holding said bars; a cover plate rotatively mounted on said supporting plate and operatively engaging all of said bars for moving the same in unison for expansion and contraction thereof; and means operatively connecting said bars and said plate, said means embodying rack teeth on each of said bars, and a spiral ridge on said cover plate engaging said teeth, said teeth on said bars being curved in correspondence to the pitch of said ridge in service relation.

PETER DE MATTIA.
BARTHOLD DE MATTIA.

Witnesses:
ELIZABETH J. MULLANEY,
MARY BURKHARDT.